UNITED STATES PATENT OFFICE.

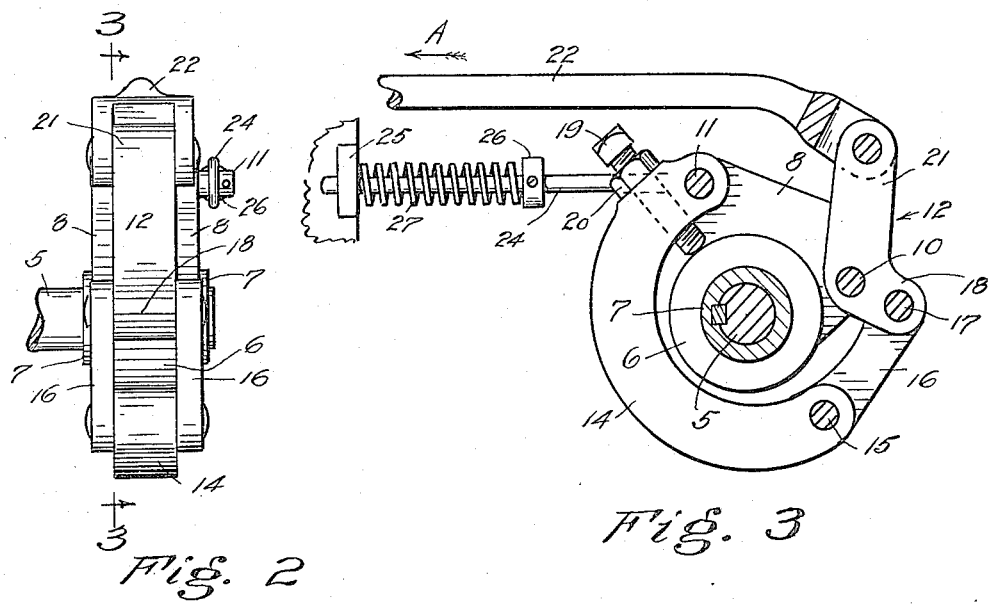
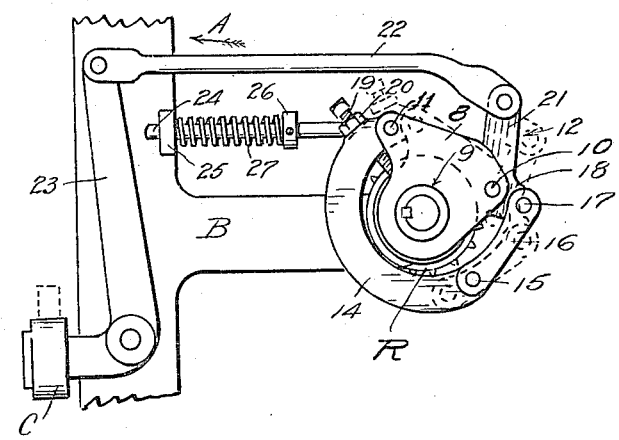

GARFIELD TAYLOR, OF LYMAN, WASHINGTON.

POWER-TRANSMISSION DEVICE.

1,165,557.  Specification of Letters Patent.  Patented Dec. 28, 1915.

Application filed November 30, 1914.  Serial No. 874,627.

*To all whom it may concern:*

Be it known that I, GARFIELD TAYLOR, a citizen of the United States, residing at Lyman, in the county of Skagit and State of Washington, have invented certain new and useful Improvements in Power-Transmission Devices, of which the following is a specification.

This invention relates to improvements in devices for converting reciprocatory into rotary motion and its object is to produce devices of this character which will perform its function with an absence of any lost motion between the driving and driven elements.

The invention consists in the novel construction, arrangement and combination of parts, as will be hereinafter described and pointed out in the claims.

In the accompanying drawings, Figure 1 is an end elevation of an embodiment of my invention applied to a part of a shingle machine carriage. Fig. 2 is a side elevation of the transmission device. Fig. 3 is a sectional view taken through 3—3 of Fig. 2.

The reference numeral 5 designates a rotary spindle to which is rigidly secured or formed integral therewith, a wheel 6 having, desirably, a hub which protrudes, as indicated by 7, from each face of the wheel. Plates 8, which are bored as at 9, to fit upon the shaft or on said hub members where used, are disposed at opposite sides of the wheel. Said plates are coupled to act as a single element by means of pins 10 and 11 disposed in substantially the positions in which they are represented in Figs. 1 and 3 with respect to each other and to the wheel 6. The pin 10 serves as the fulcrum for a bell-crank lever 12. The other pin 11 serves as a pivotal support for an end of a curved bar 14 whose other end is connected by a pin 15 with links 16 which, in turn, are connected by a pin 17 with an arm 18 of the lever 12. In proximity to the pin 11 the bar 14 is provided with a screw-threaded hole in which is engaged a screw 19, and 20 is a jam-nut whereby the screw is locked in adjusted position and causes its end to engage the periphery of the wheel 6. The arm 21 of the lever 12 is connected to a rod 22 having reciprocatory motion imparted thereto in any suitable manner as, for example, through the medium of a vibratory lever 23.

As illustrated, the before described parts are carried on the bracket B of a carriage, such as commonly employed in a shingle-sawing machine. The lever 22 is arranged to be swung in the direction indicated by arrow A through the agency of a wedge-shaped device provided upon a stationary part of the machine, being encountered by a roller C provided on the referred to lever at or near the termination of the successive forward movements of the carriage.

Connected to the pin 11 is a rod 24 passing through a guide 25 and between the latter and a set collar 26 provided on the rod is a helical spring 27 tending to turn the plates 8 and the parts connected thereto in a direction contrary to that indicated by the referred to arrow. This spring, while advantageous to the device, may be omitted if desired.

In Fig. 1, I represent by R a spur-roll which is actuated by the aforesaid devices to furnish intermittent feeding movements to a shingle block.

The operation of the invention is as follows: The spring 27 acts to yieldingly hold the plates 8 and the parts connected thereto in the positions indicated by broken lines in Fig. 1. When motion is imparted to the rod 22 in the direction of arrow A, the bell-crank arm 21 is drawn thereby to cause the bell-crank to turn upon its fulcrum 10 and raise the arm 18, resulting in the bar 14 being swung about the pin 11 and tending to thrust the inner end of screw 19 into the space between this pin and the wheel. In such movement, however, the screw encounters the wheel and forces the pin 11 outwardly thereby influencing the plates 8 to engage the hub elements 7 at the diametrically opposite side of the wheel from which it is engaged by the screw, whereupon the plates 8, together with the bar 14, and associated parts, are rotated in opposition to the spring to rotate the spindle 5 through the agency of the wheel 6. When the bell-crank 23 is released, the spring 27 asserts its power to restore the various parts into their dotted line positions (Fig. 1) without disturbing the wheel 6. Under such a condition the periphery of the wheel is contacted by the point of the screw 19 while the bar 14 and associated parts are held in operable position through the action of the spring 27 thus affording an instantaneous gripping effect when suitable motion is imparted through the medium of the rod 22 from the bell-crank 23 to the bell-crank 12.

The invention is not confined to use on only shingle machines, as it may be utilized for other purposes.

What I claim, is—

1. In mechanism of the class described, a wheel, an element mounted for rotary movements about the axis of said wheel, a lever carried by said element, a member connected with said element and the lever, an abutment provided on said member in proximity to the connection of the latter with said element, and arranged to be actuated therewith for engaging said element with the wheel when the lever is swung in one direction, and be disengaged from the wheel when the lever is swung in a contrary direction.

2. In mechanism of the class described, the combination with a rotatable wheel, an element mounted for rotation on an axis concentric with respect to the wheel, a lever fulcrumed to said element, a member hingedly connected from one of its ends to said element, operative connection between the other end of said member and the lever, an abutment carried by the member in proximity of its connection with said element, and means whereby said lever is operable to influence the abutment to cause said element to engage the wheel only when the lever is swung in one direction.

3. In mechanism of the class described, the combination with a rotatable wheel, of plates rotatable on an axis concentric with said wheel, a member hingedly connected from one of its ends to said plates, a screw extending through said member in proximity to the connection of the latter with the plates, a lever fulcrumed to said plates, operative connections between an arm of said lever and the free end of the member, a rod connected to the other arm of said lever for operating the lever, and a spring tending to yieldingly hold the plates in operable positions.

4. In mechanism of the class described, the combination with a rotatable wheel, of plates rotatable on an axis concentric with said wheel, a member hingedly connected from one of its ends to said plates, a screw extending through said member in proximity to the connection of the latter with the plates, a lever fulcrumed to said plates, operative connections between an arm of said lever and the free end of the member, and a rod connected to the other arm of said lever for operating the lever.

Signed at Seattle, Wash., this 3rd day of November, 1914.

GARFIELD TAYLOR.

Witnesses:
PIERRE BARNES,
E. PETERSON.

Copies of this patent may be obtained for five cents each, by addressing the "Commissioner of Patents Washington, D. C."